US012667782B2

(12) United States Patent
Zhang

(10) Patent No.: US 12,667,782 B2
(45) Date of Patent: Jun. 30, 2026

(54) VIDEO GAME WITH POSITION SWAPPING IN RESPAWN QUEUE

(71) Applicant: NETEASE (HANGZHOU) NETWORK CO., LTD., Hangzhou (CN)

(72) Inventor: Ruijia Zhang, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 272 days.

(21) Appl. No.: 18/557,109

(22) PCT Filed: Jul. 26, 2022

(86) PCT No.: PCT/CN2022/107938
§ 371 (c)(1),
(2) Date: Oct. 25, 2023

(87) PCT Pub. No.: WO2023/173648
PCT Pub. Date: Sep. 21, 2023

(65) Prior Publication Data
US 2024/0216803 A1     Jul. 4, 2024

(30) Foreign Application Priority Data

Mar. 17, 2022    (CN) .......................... 202210265490.2

(51) Int. Cl.
A63F 13/52          (2014.01)
A63F 13/533         (2014.01)
A63F 13/55          (2014.01)

(52) U.S. Cl.
CPC ............ *A63F 13/52* (2014.09); *A63F 13/533* (2014.09); *A63F 13/55* (2014.09)

(58) Field of Classification Search
None
See application file for complete search history.

(56) References Cited

U.S. PATENT DOCUMENTS

2015/0157929 A1*  6/2015  Hall ........................ A63F 13/85
                                                          463/25
2017/0312632 A1*  11/2017  Curley .................. A63F 13/573
                                (Continued)

FOREIGN PATENT DOCUMENTS

CN          104346507 A      2/2015
CN          107993292 A      5/2018
                        (Continued)

OTHER PUBLICATIONS

International Search Report and Written Opinion with regard to PCT/CN2022/107938 mailed Nov. 25, 2022.
                        (Continued)

*Primary Examiner* — Lawrence S Galka
(74) *Attorney, Agent, or Firm* — BCF LLP

(57)                    ABSTRACT

Provided are an in-game processing method, an in-game processing apparatus, a terminal, and a storage medium. The method includes: determining, in response to character attributes of a virtual object satisfying a first attribute threshold, a first order, in which the character attributes of the virtual object are restored to a second attribute threshold, configured by the game application; in response to an order transfer operation, determining a target virtual character from at least one virtual character, changing an order of the target virtual character from the current order to the first order, and changing the order of the virtual object from the first order to a preset order, wherein at least one virtual character is a character whose character attributes satisfy the first attribute threshold; and controlling to restore the character attributes of the target virtual character to the second attribute threshold according to the first order.

19 Claims, 4 Drawing Sheets

(56) References Cited

U.S. PATENT DOCUMENTS

| | | | |
|---|---|---|---|
| 2019/0122414 A1 | 4/2019 | Sagong et al. | |
| 2021/0178278 A1 | 6/2021 | Qiu et al. | |
| 2021/0220742 A1* | 7/2021 | Yu | A63F 13/837 |

FOREIGN PATENT DOCUMENTS

| | | | |
|---|---|---|---|
| CN | 109614171 A | 4/2019 | |
| CN | 109675311 A | 4/2019 | |
| CN | 109806588 A | 5/2019 | |
| CN | 111714893 A | 9/2020 | |
| CN | 112516594 A | 3/2021 | |
| CN | 112619145 A | 4/2021 | |
| CN | 113134240 A | 7/2021 | |
| CN | 113262475 | 8/2021 | |
| CN | 113617035 A | 11/2021 | |
| CN | 113680058 A | 11/2021 | |
| JP | 2005006993 A | 1/2005 | |
| JP | 2007075446 A | 3/2007 | |
| JP | 2007244741 A | 9/2007 | |
| JP | 2008289702 A | 12/2008 | |
| JP | 2009172239 A | 8/2009 | |
| JP | 2013046653 A | 3/2013 | |
| JP | 2013066524 A | 4/2013 | |
| JP | 2018057423 A | 4/2018 | |
| JP | 2018075319 A | 5/2018 | |
| JP | 2018075320 A | 5/2018 | |
| JP | 2018099260 A | 6/2018 | |
| JP | 2018099261 A | 6/2018 | |
| JP | 2018108191 A | 7/2018 | |
| JP | 2019202007 A | 11/2019 | |
| JP | 2020188990 A | 11/2020 | |
| JP | 2020189097 A | 11/2020 | |
| JP | 2020195522 A | 12/2020 | |
| JP | 2021041023 A | 3/2021 | |
| JP | 2022062378 A | 4/2022 | |
| JP | 2022062467 A | 4/2022 | |
| KR | 20190045013 A | 5/2019 | |
| WO | 2020143146 A1 | 7/2020 | |

OTHER PUBLICATIONS

Notification of Grant with regard to CN 202210265490.2 dated Jun. 30, 2023.

Notice of Refusal with regard to the JP Patent Application No. JP2023-553681 mailed Aug. 30, 2024.

Notice of Refusal with regard to the JP Patent Application No. 2023-553681 mailed Nov. 19, 2024.

Notice of Refusal with regard to the JP Patent Application No. 2023-553681 mailed Apr. 11, 2025.

Decision to Grant with regard to the JP Patent Application No. JP2023-553681 mailed Jul. 18, 2025.

* cited by examiner

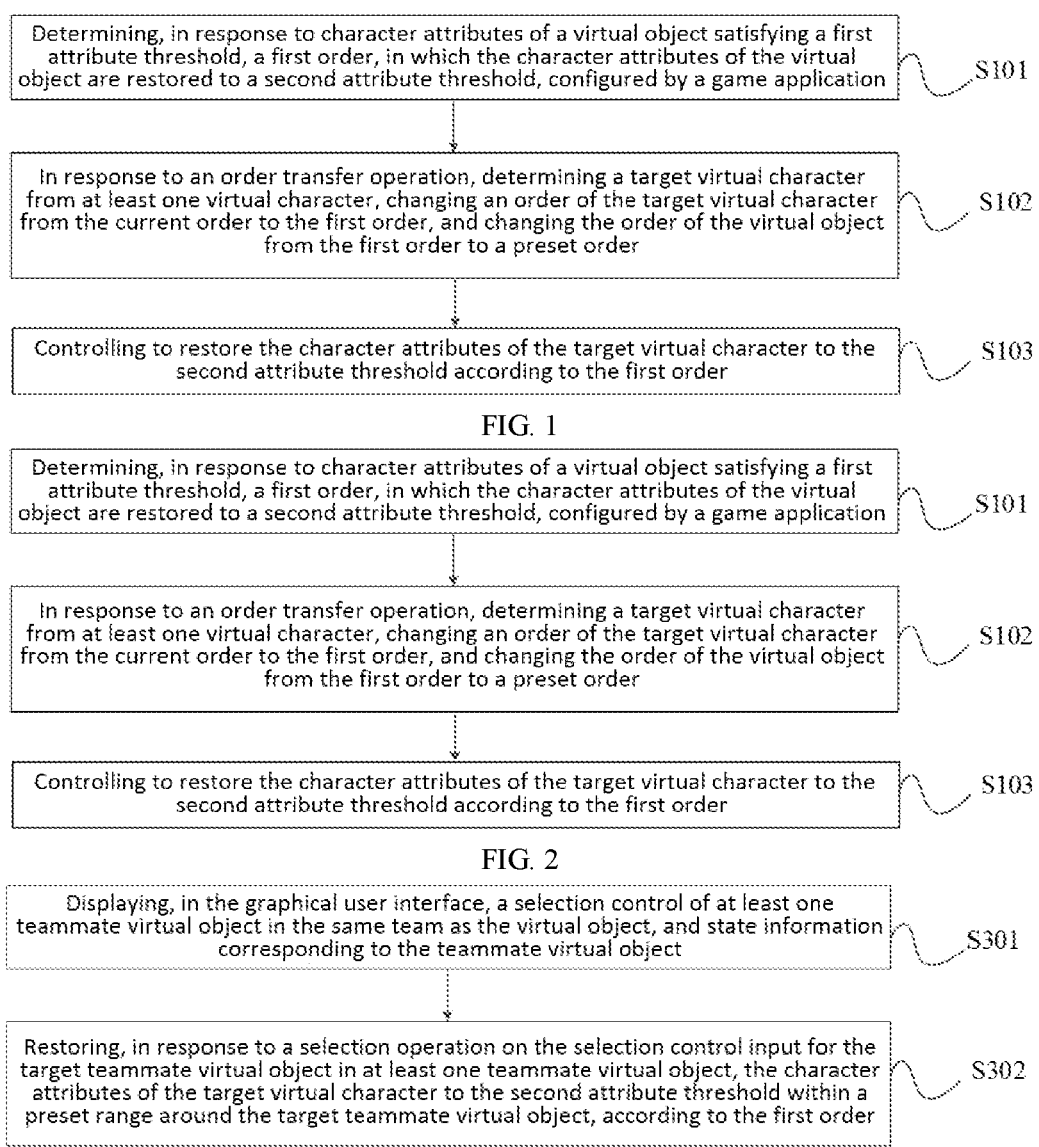

Determining, in response to character attributes of a virtual object satisfying a first attribute threshold, a first order, in which the character attributes of the virtual object are restored to a second attribute threshold, configured by a game application        S101

In response to an order transfer operation, determining a target virtual character from at least one virtual character, changing an order of the target virtual character from the current order to the first order, and changing the order of the virtual object from the first order to a preset order        S102

Controlling to restore the character attributes of the target virtual character to the second attribute threshold according to the first order        S103

FIG. 1

Determining, in response to character attributes of a virtual object satisfying a first attribute threshold, a first order, in which the character attributes of the virtual object are restored to a second attribute threshold, configured by a game application        S101

In response to an order transfer operation, determining a target virtual character from at least one virtual character, changing an order of the target virtual character from the current order to the first order, and changing the order of the virtual object from the first order to a preset order        S102

Controlling to restore the character attributes of the target virtual character to the second attribute threshold according to the first order        S103

FIG. 2

Displaying, in the graphical user interface, a selection control of at least one teammate virtual object in the same team as the virtual object, and state information corresponding to the teammate virtual object        S301

Restoring, in response to a selection operation on the selection control input for the target teammate virtual object in at least one teammate virtual object, the character attributes of the target virtual character to the second attribute threshold within a preset range around the target teammate virtual object, according to the first order        S302

FIG. 3

Jumping to a restoration waiting interface in response to the character attributes of the virtual object satisfying the first attribute threshold ⎫ S701

Displaying in the restoration waiting interface a redeployment waiting duration of the virtual object and state information on at least one teammate virtual object of the virtual object ⎫ S702

FIG. 7

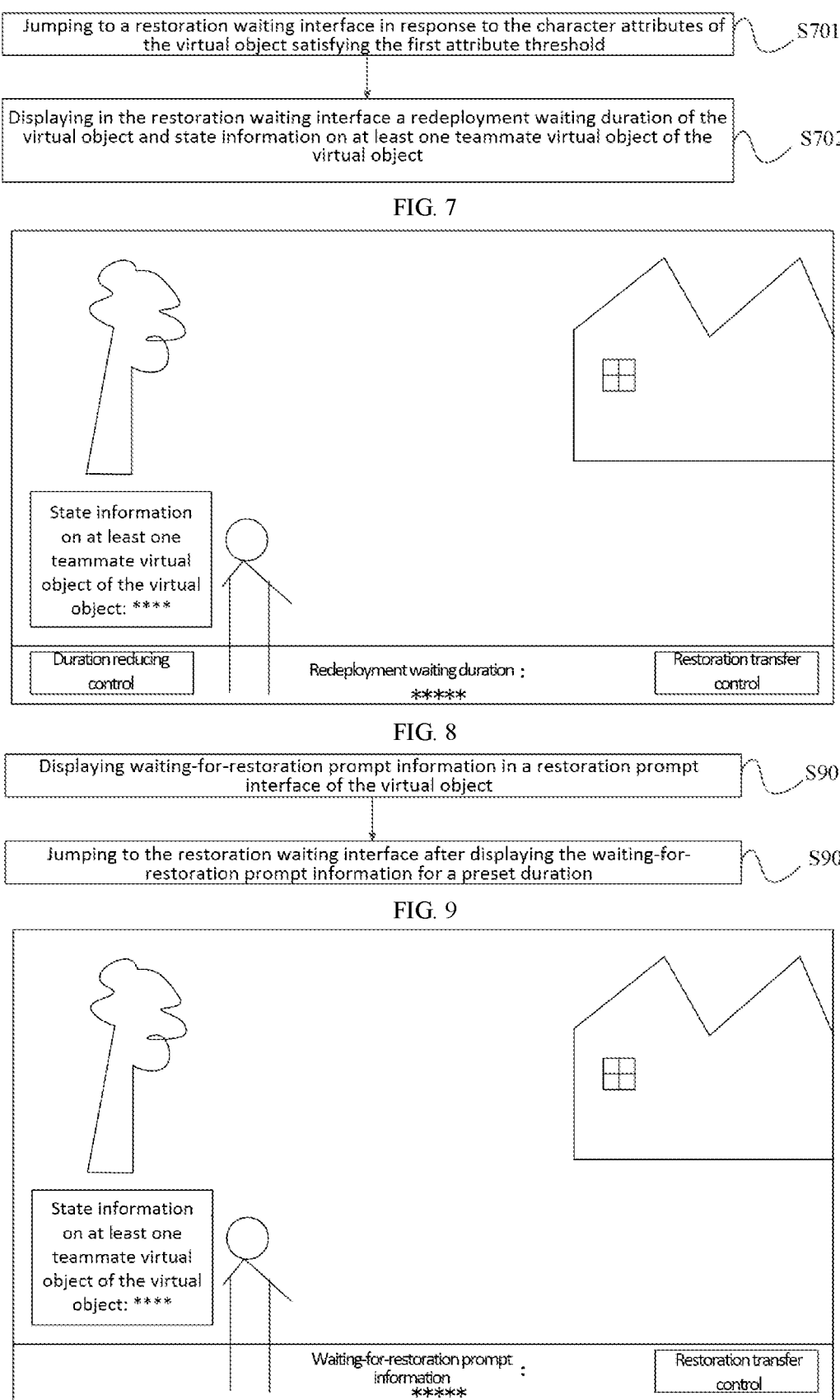

State information on at least one teammate virtual object of the virtual object: ****

Duration reducing control

Redeployment waiting duration :
*****

Restoration transfer control

FIG. 8

Displaying waiting-for-restoration prompt information in a restoration prompt interface of the virtual object ⎫ S901

Jumping to the restoration waiting interface after displaying the waiting-for-restoration prompt information for a preset duration ⎫ S902

FIG. 9

State information on at least one teammate virtual object of the virtual object: ****

Waiting-for-restoration prompt information :
*****

Restoration transfer control

FIG. 10

VIDEO GAME WITH POSITION SWAPPING IN RESPAWN QUEUE

CROSS-REFERENCE TO RELATED APPLICATIONS

The present disclosure is a U.S. National Phase application of PCT International Application No. PCT/CN2022/107938, filed on Jul. 26, 2022, which is based upon and claims priority to the Chinese patent application No. 202210265490.2 filed on Mar. 17, 2022 with the China National Intellectual Property Administration and entitled "METHOD AND APPARATUS FOR PROCESSING IN GAME, TERMINAL DEVICE, AND STORAGE MEDIUM", the entire contents of both of which are hereby incorporated by reference for all purposes.

TECHNICAL FIELD

The present disclosure relates to the technical field of games, in particular, to an in-game processing method, an in-game processing apparatus, a terminal, and a storage medium.

BACKGROUND

With the rapid development of Internet technologies, there are more and more types of network games. In some combat-type games, a virtual object can participate in a combat, and in a process of participating in the combat, the virtual object generally consumes attributes, then performing subsequent processing on the virtual object having consumed the attributes becomes a hot spot of research.

In the related art, after the attributes of the virtual object are consumed, the attributes consumed by the virtual object can be directly restored.

SUMMARY

In some embodiments, the present disclosure provides an in-game processing method, including a terminal determining, in response to character attributes of a virtual object satisfying a first attribute threshold, a first order, in which the character attributes of the virtual object are restored to a second attribute threshold, configured by a game application, where a graphical user interface of the game application is provided by the terminal; in response to an order transfer operation, determining a target virtual character from at least one virtual character, changing an order of the target virtual character from a current order to the first order, and changing an order of the virtual object from the first order to a preset order, where the at least one virtual character is a character whose character attributes satisfy the first attribute threshold; and controlling to restore character attributes of the target virtual character to the second attribute threshold according to the first order.

In some embodiments, the present disclosure further provides a terminal, including a memory and a processor, where the memory stores a computer program executable by the processor, and when the processor executes the computer program, an in-game processing method is realized, where the in-game processing method includes: the terminal determining, in response to character attributes of a virtual object satisfying a first attribute threshold, a first order, in which the character attributes of the virtual object are restored to a second attribute threshold, configured by a game application, where a graphical user interface of the game application is provided by the terminal; in response to an order transfer operation, determining a target virtual character from at least one virtual character, changing an order of the target virtual character from a current order to the first order, and changing an order of the virtual object from the first order to a preset order, where the at least one virtual character is a character whose character attributes satisfy the first attribute threshold; and controlling to restore character attributes of the target virtual character to the second attribute threshold according to the first order.

In some embodiments, the present disclosure further provides a storage medium, where the storage medium stores a computer program, and when the computer program is read and executed, an in-game processing method is realized, where the in-game processing method includes: determining, in response to character attributes of a virtual object satisfying a first attribute threshold, a first order, in which the character attributes of the virtual object are restored to a second attribute threshold, configured by a game application, where a graphical user interface of the game application is provided by a terminal; in response to an order transfer operation, determining a target virtual character from at least one virtual character, changing an order of the target virtual character from a current order to the first order, and changing an order of the virtual object from the first order to a preset order, where the at least one virtual character is a character whose character attributes satisfy the first attribute threshold; and controlling to restore character attributes of the target virtual character to the second attribute threshold according to the first order.

BRIEF DESCRIPTION OF DRAWINGS

In order to more clearly illustrate technical solutions of embodiments of the present disclosure, drawings which need to be used in the embodiments will be introduced briefly below, and it should be understood that the drawings below merely show some embodiments of the present disclosure, and therefore should not be considered as limitation to the scope, and a person ordinarily skilled in the art still could obtain other relevant drawings according to these drawings, without using any creative efforts.

FIG. 1 is a schematic flowchart of an in-game processing method provided in an embodiment of the present disclosure;

FIG. 2 is a schematic flowchart of an in-game processing method provided in an embodiment of the present disclosure;

FIG. 3 is a schematic flowchart of an in-game processing method provided in an embodiment of the present disclosure;

FIG. 7 is a schematic flowchart of an in-game processing method provided in an embodiment of the present disclosure;

FIG. 8 is a schematic diagram of a restoration waiting interface provided in an embodiment of the present disclosure;

FIG. 9 is a schematic flowchart of an in-game processing method provided in an embodiment of the present disclosure;

FIG. 10 is a schematic diagram of a restoration prompt interface provided in an embodiment of the present disclosure;

DETAILED DESCRIPTION

Figure 4:
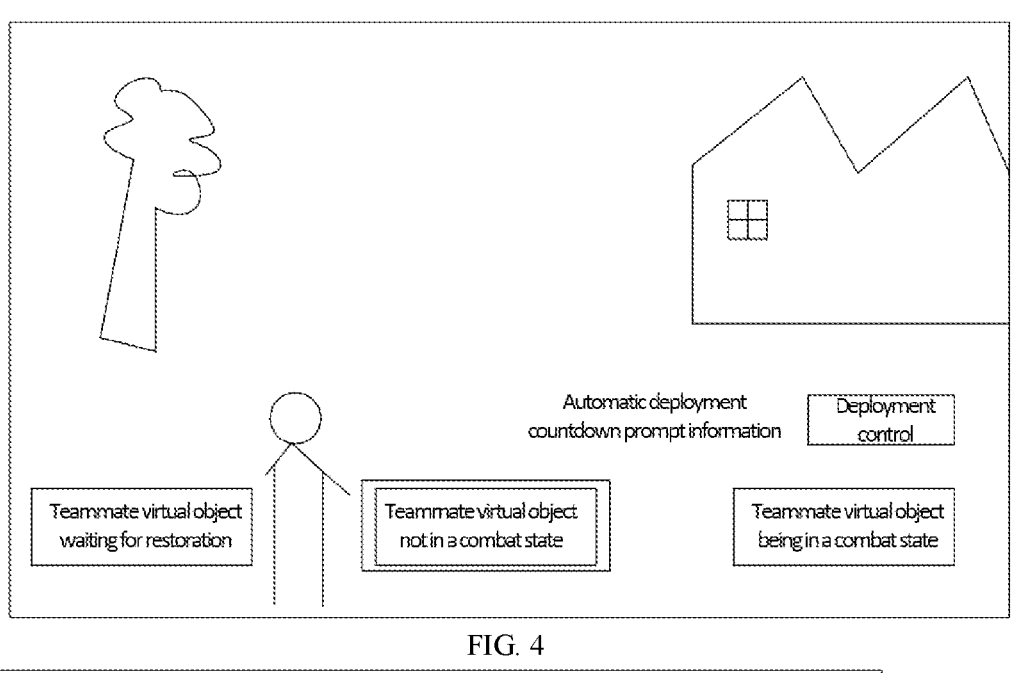
FIG. 4 is a schematic diagram of a graphical user interface provided in an embodiment of the present disclosure.

In order to make objectives, technical solutions, and advantages of the embodiments of the present disclosure clearer, the technical solutions in the embodiments of the present disclosure will be described clearly and completely below with reference to the drawings in the embodiments of the present disclosure, and apparently, some but not all embodiments of the present disclosure are described.

Therefore, the detailed description below of the embodiments of the present disclosure provided in the drawings is not intended to limit the scope of protection of the present disclosure, but merely represents chosen embodiments of the present disclosure. All of other embodiments, obtained by a person ordinarily skilled in the art on the basis of the embodiments in the present disclosure without using any creative efforts, will fall within the scope claimed in the present disclosure.

In the description of the present disclosure, it should be noted that the orientation or positional relationship indicated by the terms such as "upper" and "lower", if appear, are based on the orientation or positional relationship shown in the drawings, or the orientation or positional relationship in which the inventive product is usually placed in use, and it is only for facilitating describing the present disclosure and simplifying the description, rather than indicating or implying that the related apparatus or element must be in a specific orientation, or constructed or operated in a specific orientation, and therefore it cannot be understood as a limitation to the present disclosure.

Besides, the terms "first", "second" and the like in the description, the claims, and the above drawings of the present disclosure are used for distinguishing similar objects, and are not necessarily used to describe a specific order or sequence. It should be understood that the terms used in this way can be exchangeable under appropriate circumstances, so that the embodiments of the present disclosure described herein can be implemented in an order other than those illustrated or described herein. Besides, terms "include (comprise)", "have", and any derivatives thereof are intended to be non-exclusive, for example, a process, a method, a system, a product or a device that contains a series of steps or units is not necessarily limited to those steps or units expressly listed, but may include other steps or units not expressly listed or inherent to such process, method, product or device.

It should be noted that features in embodiments of the present disclosure may be combined with each other without conflicts.

An in-game processing method in an embodiment of the present disclosure may run on a local terminal or a server. When the in-game processing method runs on a server, this method can be realized and executed based on a cloud interaction system, where the cloud interaction system includes the server and a client device.

In some embodiments, the cloud interaction system may run various cloud applications, for example, a cloud game. Taking the cloud game as an example, the cloud game refers to a cloud computing-based game mode. In a running mode of the cloud game, a running subject of a game program and a game screen presentation subject are separated, storage and running of the in-game processing method are completed on a cloud game server, a client device functions to receive and transmit data and present the game screen, for example, the client device may be a display device with a data transmission function close to a player side, e.g., a mobile terminal, a television, a computer, a handheld computer, etc. However, it is the cloud game server in the cloud that performs information processing. When playing, the player operates the client device to send an operation instruction to the cloud game server, the cloud game server runs the game according to the operation instruction, encodes and compresses data such as the game screen, and returns the same to the client device via network, and finally, the client device decodes the data and outputs the game screen.

In some embodiments, taking a game as an example, the local terminal stores a game program and is configured to present a game screen. The local terminal is configured to interact with a player via a graphical user interface, i.e., conventionally downloading and installing the game program and running the same through an electronic device. The local terminal may provide the graphical user interface to the player in various manners, for example, the graphical user interface may be rendered and displayed on a display screen of the terminal, or may be provided to the player by means of holographical projection. For example, the local terminal may include a display screen and a processor, where the display screen is configured to present the graphical user interface, the graphical user interface includes the game screen, and the processor is configured to run the game, generate the graphical user interface, and control the display of the graphical user interface on the display screen.

However, in the related art, for directly restoring the attributes consumed by the virtual object, the flexibility of restoring the attributes of the virtual object is relatively poor, thus lowering players' game experience.

In the in-game processing method provided in an embodiment of the present disclosure, a graphical user interface is provided by a terminal, where the terminal may be the local terminal in the preceding, and also may be a client device in a cloud interaction system.

FIG. 1 is a schematic flowchart of an in-game processing method provided in an embodiment of the present disclosure, and as shown in FIG. 1, this method may include the following steps.

S101, determining, in response to character attributes of a virtual object satisfying a first attribute threshold, a first order, in which the character attributes of the virtual object are restored to a second attribute threshold, configured by a game application.

In the above, in a playing process of the virtual object, the character attributes of the virtual object will be consumed, i.e., the character attributes of the virtual object will be reduced.

In some embodiments, a terminal can acquire the character attributes of the virtual object in real time, judge whether the character attributes of the virtual object satisfy the first attribute threshold, and if the character attributes of the virtual object satisfy the first attribute threshold, determine the first order, in which the character attributes of the virtual object are restored to the second attribute threshold, configured by the game application.

It should be noted that, the first order in which the character attributes of the virtual object are restored to the second attribute threshold may refer to a current sequence in which the character attributes of the virtual object are restored to the second attribute threshold in the game application.

In an embodiment of the present disclosure, the character attributes of the virtual object may be an energy parameter of the virtual object, also may be an attack force parameter, a defensive force parameter, or a protection value parameter of the virtual object, and also may be other types of character attributes, which are not specifically limited herein in the embodiments of the present disclosure.

In some embodiments, the virtual object may be a controlled virtual character, and the character attributes may be attribute information on the controlled virtual character.

S102, in response to an order transfer operation, determining a target virtual character from at least one virtual character, changing an order of the target virtual character from the current order to the first order, and changing the order of the virtual object from the first order to a preset order.

In the above, at least one virtual character is a character whose character attributes satisfy the first attribute threshold.

In some embodiments, the player can input the order transfer operation, and the terminal can, in response to the order transfer operation, determine the target virtual character from at least one virtual character, and change the current order in which the character attributes of the target virtual character are restored to the second attribute threshold into the first order, where the current order may be behind the first order, and subsequently, the order in which the character attributes of the virtual object are restored to the second attribute threshold is changed from the first order to the preset order.

In an embodiment of the present disclosure, the current order of the target virtual character and the first order of the virtual object can be exchanged with each other, that is, the preset order may be the current order of the target virtual character before the change, and the preset order also may be the last order in all sequences, and also may be other positions in all sequences, which is not specifically limited herein in the embodiments of the present disclosure.

S103, controlling to restore the character attributes of the target virtual character to the second attribute threshold according to the first order.

In some embodiments, the terminal restores, according to all sequences, character attributes of each virtual character to be restored to a second attribute in sequence, and when it is the turn of the first order, restores the character attributes of the target virtual character to the second attribute threshold.

Regarding the technical problems existing in the related art, an embodiment of the present disclosure provides an in-game processing method, where if character attributes of a virtual object satisfy a first attribute threshold, a first order in which the character attributes of the virtual object are restored to a second attribute threshold in a game application is determined; and in response to an order transfer operation, the first order of the virtual object when restoring the character attributes is assigned to a target virtual character, realizing that character attributes of the target virtual character can be restored according to the first order, which makes a sequence of restoring the character attributes of the virtual object in the game more flexible, and improves players' game experience.

In summary, an embodiment of the present disclosure provides an in-game processing method, where this method includes: determining, in response to character attributes of a virtual object satisfying a first attribute threshold, a first order, in which the character attributes of the virtual object are restored to a second attribute threshold, configured by a game application; in response to an order transfer operation, determining a target virtual character from at least one virtual character, changing an order of the target virtual character from the current order to the first order, and changing the order of the virtual object from the first order to a preset order, where at least one virtual character is a character whose character attributes satisfy the first attribute threshold; and controlling to restore the character attributes of the target virtual character to the second attribute threshold according to the first order. In response to the order transfer operation, the first order of the virtual object when restoring the character attributes is assigned to the target virtual character, realizing that the character attributes of the target virtual character can be restored according to the first order, which makes a sequence of restoring the character attributes of the virtual object in the game more flexible, and improves players' game experience.

In some embodiments, a process of determining, in response to character attributes of a virtual object satisfying a first attribute threshold, a first order, in which the character attributes of the virtual object are restored to a second attribute threshold, configured by the game application in the above S101 may include:

determining, in response to a character energy parameter of the virtual object being smaller than or equal to a preset first energy threshold, a first order, in which the character energy parameter of the virtual object is restored to a preset second energy threshold, configured by the game application.

In the above, the character energy parameter of the virtual object can be used to characterize a current energy value of the virtual object in the game application. For example, the current energy value may be a blood volume of the virtual object.

In an embodiment of the present disclosure, the terminal can judge whether the character energy parameter of the virtual object is smaller than or equal to a preset first energy threshold, and then determine a first order, in which the character energy parameter of the virtual object is restored to a preset second energy threshold, configured by the game application, that is, determine the first order configured by the game application for restoring the energy of the virtual object.

In the above, the character energy parameter of the virtual object being smaller than or equal to the preset first energy threshold may include two cases: the character energy parameter of the virtual object is relatively low, or the character energy parameter of the virtual object is 0, and the virtual object has been eliminated.

Of course, the character attributes of the virtual object also may be other types of character attributes, for example, an attack force parameter, a defensive force parameter, or a protection value parameter; when the attacking force parameter does not satisfy the first attribute threshold, the attack force parameter can be restored to the second attribute threshold; when the defensive force parameter does not satisfy the first attribute threshold, the defensive force parameter can be restored to the second attribute threshold;

and when the protection value parameter does not satisfy the first attribute threshold, the protection value parameter can be restored to the second attribute threshold.

In some embodiments, FIG. 2 is a schematic flowchart of an in-game processing method provided in an embodiment of the present disclosure, and as shown in FIG. 2, a process of determining, in response to character attributes of a virtual object satisfying a first attribute threshold, a first order, in which the character attributes of the virtual object are restored to a second attribute threshold, configured by the game application in the above S101 includes the following steps.

S201, determining, in response to the character attributes of the virtual object satisfying the first attribute threshold, waiting duration information configured by the game application for restoring the character attributes of the virtual object to the second attribute threshold.

In some embodiments, if the character attributes of the virtual object satisfy the first attribute threshold, the terminal determines cumulative waiting duration information for restoring the character attributes of the virtual object to the second attribute threshold according to at least one virtual object to be restored whose character attributes having been determined to satisfy the first attribute threshold before the virtual object.

S202, determining the first order according to the waiting duration information.

In the above, the terminal can determine a current sequence of the virtual object, i.e., the first order, according to the waiting duration information and a preset unit waiting duration, i.e., duration required for restoring character attributes of one virtual object.

In some embodiments, a process of controlling to restore the character attributes of the target virtual character to the second attribute threshold according to the first order in the above S103 may include a step of restoring, in response to a selection operation on a restoration position, the character attributes of the target virtual character to the second attribute threshold at the restoration position selected, according to the first order.

It should be noted that, the input selection operation on the restoration position may be a selection operation input for a target position in a game scene, and also may be a selection operation input for a target virtual article in a game scene. The selection operation on the restoration position is not specifically limited in the embodiments of the present disclosure.

In some embodiments, FIG. 3 is a schematic flowchart of an in-game processing method provided in an embodiment of the present disclosure, and as shown in FIG. 3, a process of the above step of restoring, in response to a selection operation on a restoration position, the character attributes of the target virtual character to the second attribute threshold at the restoration position selected may include the following steps.

S301, displaying, in the graphical user interface, a selection control of at least one teammate virtual object in the same team as the virtual object, and state information corresponding to the teammate virtual object.

FIG. 4 is a schematic diagram of a graphical user interface provided in an embodiment of the present disclosure, and as shown in FIG. 4, the selection control of at least one teammate virtual object and the state information corresponding to the teammate virtual object are displayed in the graphical user interface.

As shown in FIG. 4, the state information corresponding to the teammate virtual object may include: a teammate virtual object waiting for restoration, a teammate virtual object not in a combat state, and a teammate virtual object being in a combat state.

In the above, the state information corresponding to the teammate virtual object further may include information such as an identifier, a number, a name, and a blood volume of the teammate virtual object.

It should be noted that different state information also may be represented by different state icons, as long as the player can acquire the state information corresponding to the teammate virtual object, which is not specifically limited herein in the embodiments of the present disclosure.

S302, restoring, in response to a selection operation on the selection control input for the target teammate virtual object in at least one teammate virtual object, the character attributes of the target virtual character to the second attribute threshold within a preset range around the target teammate virtual object, according to the first order.

In the above, in response to the selection operation on the selection control input for the target teammate virtual object in at least one teammate virtual object, the preset range around the target teammate virtual object is determined, and when it is the turn of the first order, the character attributes of the target virtual character are restored to the second attribute threshold within the preset range around the target teammate virtual object.

For example, when the virtual object is eliminated, the virtual object can be resurrected within the preset range around the target teammate virtual object.

Figure 5:
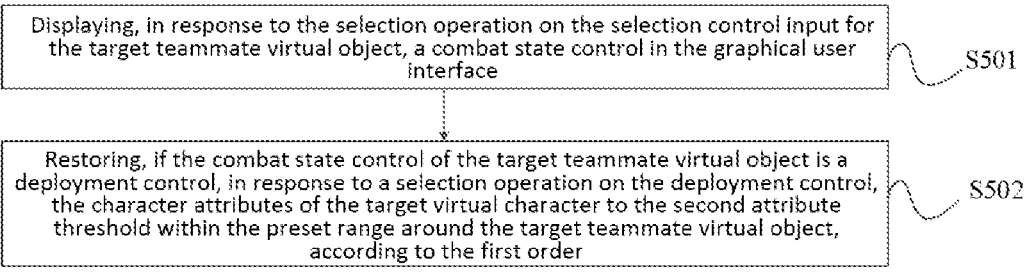
FIG. 5 is a schematic flowchart of an in-game processing method provided in an embodiment of the present disclosure.

In some embodiments, FIG. 5 is a schematic flowchart of an in-game processing method provided in an embodiment of the present disclosure, and as shown in FIG. 5, a process of restoring, in response to a selection operation on the selection control input for the target teammate virtual object in at least one teammate virtual object, the character attributes of the target virtual character to the second attribute threshold within a preset range around the target teammate virtual object, according to the first order in the above S302 may include the followings steps.

S501, displaying, in response to the selection operation on the selection control input for the target teammate virtual object, a combat state control in the graphical user interface.

In an embodiment of the present disclosure, in response to the selection operation on the selection control input for the target teammate virtual object, the combat state control is displayed in the graphical user interface according to the state information corresponding to the target teammate virtual object.

S502, restoring, if the combat state control of the target teammate virtual object is a deployment control, in response to a selection operation on the deployment control, the character attributes of the target virtual character to the second attribute threshold within the preset range around the target teammate virtual object, according to the first order.

As shown in FIG. 4, if the state information corresponding to the target teammate virtual object indicates that the target teammate virtual object is not in a combat state, the combat state control of the target teammate virtual object is the deployment control, and the deployment control is an operable control.

In the above, the character attributes of the target virtual character can be restored to the second attribute threshold within the preset range around the target teammate virtual object not in a combat state.

In addition, as shown in FIG. 4, the graphical user interface further may display automatic deployment countdown prompt information, where the automatic deployment countdown prompt information is configured to prompt that automatic deployment is performed after the countdown is completed, and in some embodiments, a duration of the countdown can be set according to an actual requirement, and may be, for example, 30 seconds.

In practical application, the preset range around the target teammate virtual object may be a preset distance range of the target teammate virtual object, for example, 1-10 meters behind the target teammate virtual object, so as to avoid appearance in front of the target teammate virtual object to block vision of the target teammate virtual object.

In some embodiments, this method further may include: if the target teammate virtual object is currently in a combat, the combat state control prompting that the target teammate virtual object is in a combat state, and setting the combat state control to an uncontrollable state, where the combat state control may be in a grayed state.

Besides, if the target teammate virtual object is currently in a to-be-restored state, the combat state control is also set to the uncontrollable state, and the combat state control may be set to the grayed state.

Figure 6:
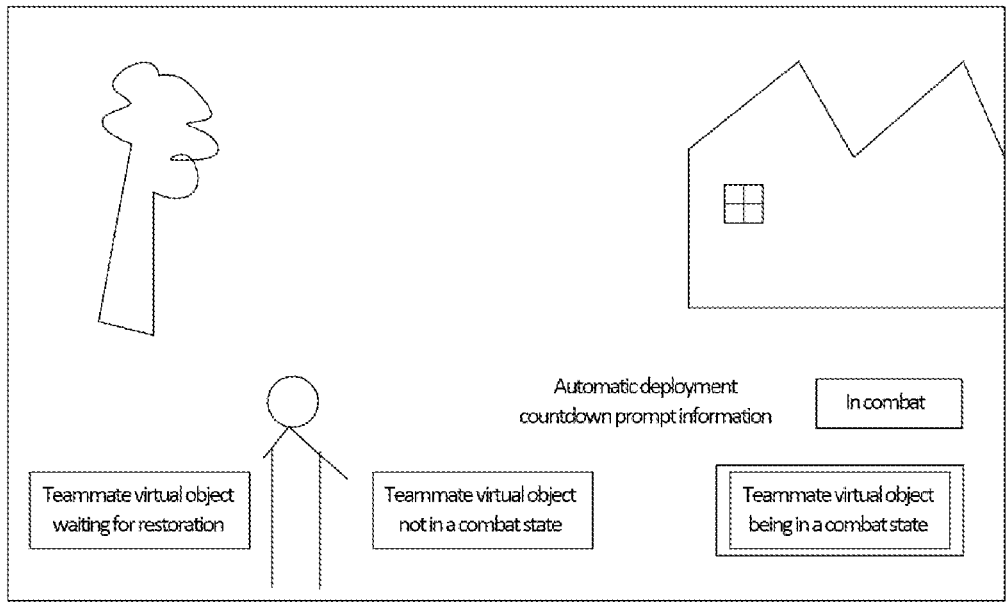
FIG. 6 is a schematic diagram of a graphical user interface provided in an embodiment of the present disclosure.

FIG. 6 is a schematic diagram of a graphical user interface provided in an embodiment of the present disclosure, and as shown in FIG. 6, if the state information on the target teammate virtual object indicates that the target teammate virtual object currently is in a combat, the combat state control prompts that the target teammate virtual object is in a combat state and is in an uncontrollable state, for example, the combat state control can display "In combat".

In some embodiments, FIG. 7 is a schematic flowchart of an in-game processing method provided in an embodiment of the present disclosure, and as shown in FIG. 7, this method further may include steps of:

S701, jumping to a restoration waiting interface in response to the character attributes of the virtual object satisfying the first attribute threshold; and S702, displaying in the restoration waiting interface a redeployment waiting duration of the virtual object and state information on at least one teammate virtual object of the virtual object.

In the above, the redeployment waiting duration also may be countdown.

For example, the redeployment waiting duration may be: waiting for deployment again after 180 seconds.

FIG. 8 is a schematic diagram of a restoration waiting interface provided in an embodiment of the present disclosure, and as shown in FIG. 8, the redeployment waiting duration of the virtual object and the state information on at least one teammate virtual object of the virtual object are displayed in the restoration waiting interface.

In some embodiments, FIG. 9 is a schematic flowchart of an in-game processing method provided in an embodiment of the present disclosure, and as shown in FIG. 9, a process of jumping to a restoration waiting interface in the above S701 may include the following steps.

S901, displaying waiting-for-restoration prompt information in a restoration prompt interface of the virtual object.

In the above, the waiting-for-restoration prompt information may include first order and corresponding waiting duration information.

FIG. 10 is a schematic diagram of a restoration prompt interface provided in an embodiment of the present disclosure, and as shown in FIG. 10, the waiting-for-restoration prompt information is displayed in the restoration prompt interface, for example, the waiting-for-restoration prompt information may be: waiting for redeployment, two persons ahead, expected waiting duration of 210 seconds, etc.

S902, jumping to the restoration waiting interface after displaying the waiting-for-restoration prompt information for a preset duration.

In the above, after countdown of the preset duration of the waiting-for-restoration prompt information ends, jump to the restoration waiting interface, where the preset duration may be waiting duration information.

In some embodiments, as shown in FIG. 8, the restoration waiting interface includes therein a duration reducing control.

This method further may include a step of determining, in response to a selection operation on the duration reducing control, to consume a virtual resource of the virtual object, and reducing the redeployment waiting duration by time corresponding to the virtual resource.

In some embodiments, as shown in FIG. 8 and FIG. 10, the restoration waiting interface and the restoration prompt interface include therein a restoration transfer control; and the order transfer operation is a selection operation on the restoration transfer control. As shown in FIG. 10, the restoration prompt interface also includes the state information on at least one teammate virtual object of the virtual object.

In an embodiment of the present disclosure, in response to a selection operation on the restoration transfer control, the target virtual character is determined from at least one virtual character, the order of the target virtual character is changed from the current order to the first order, and the order of the virtual object is changed from the first order to the preset order.

Figures 11, 12, 13:
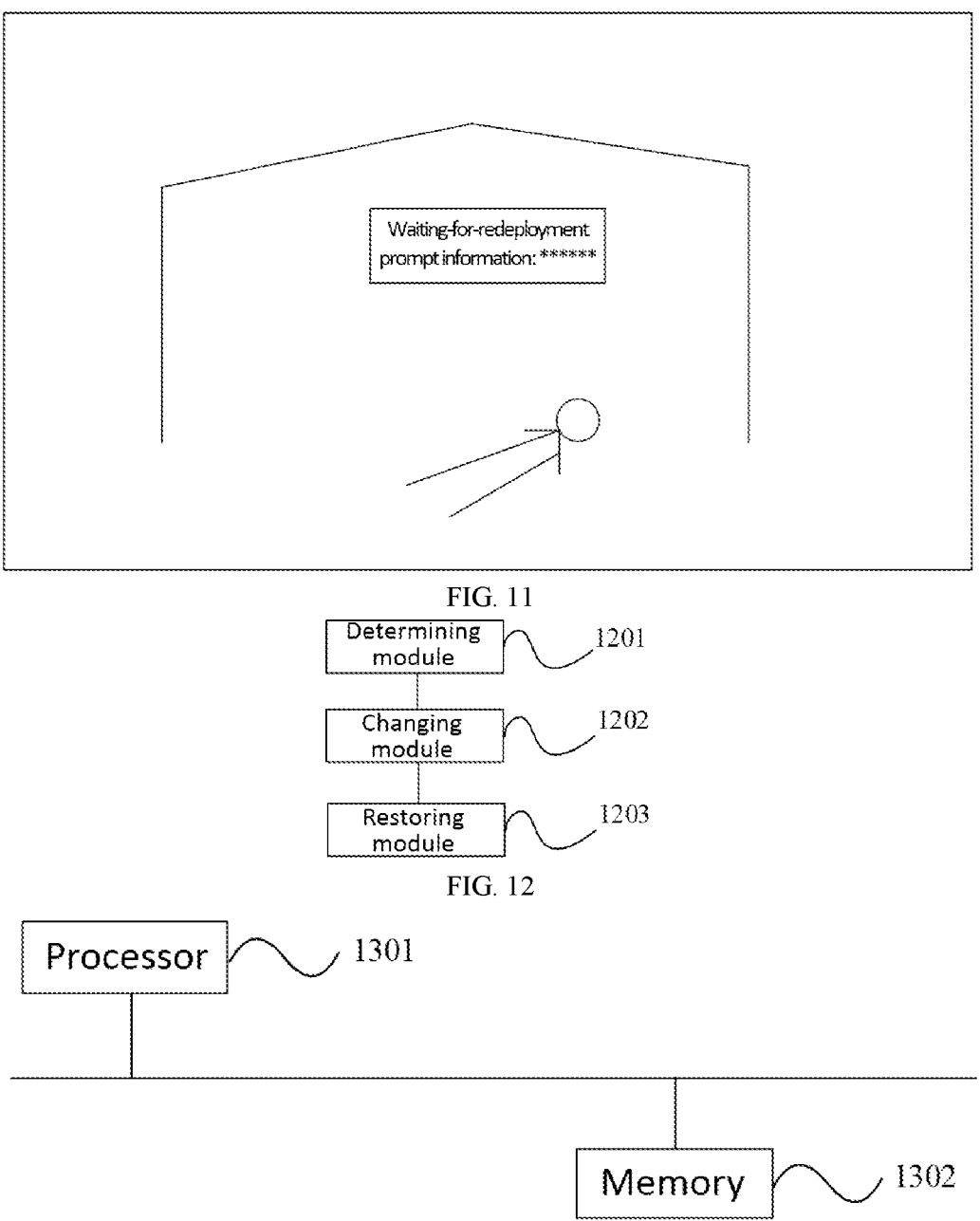
FIG. 11 is a schematic diagram of a waiting-for-redeployment interface provided in an embodiment of the present disclosure.
FIG. 12 is a structural schematic diagram of an in-game processing apparatus provided in an embodiment of the present disclosure.
FIG. 13 is a structural schematic diagram of a terminal provided in an embodiment of the present disclosure.

In some embodiments, FIG. 11 is a schematic diagram of a waiting-for-redeployment interface provided in an embodiment of the present disclosure, where in response to the character attributes of the virtual object satisfying the first attribute threshold, the waiting-for-redeployment interface is displayed, the waiting-for-redeployment interface displays the waiting-for-redeployment prompt information, and after the waiting-for-redeployment interface is displayed for a preset duration, it is jumped to the restoration waiting interface.

In conclusion, the in-game processing method provided by the embodiments of the present application includes steps of determining, in response to character attributes of a virtual object satisfying a first attribute threshold, a first order, in which the character attributes of the virtual object are restored to a second attribute threshold, configured by the game application; in response to an order transfer operation, determining a target virtual character from at least one virtual character, changing an order of the target virtual character from the current order to the first order, and changing the order of the virtual object from the first order to a preset order, where at least one virtual character is a character whose character attributes satisfy the first attribute threshold; and controlling to restore the character attributes of the target virtual character to the second attribute threshold according to the first order. In response to the order transfer operation, the first order of the virtual object when restoring the character attributes is assigned to the target virtual character, realizing that the character attributes of the target virtual character can be restored according to the first order, which makes a sequence of restoring the character attributes of the virtual object in the game more flexible, and improves players' game experience The in-game processing apparatus, the terminal, the storage medium, and the like used to execute the in-game processing method provided in the present disclosure are illustrated below, and for specific implementation processes and technical effects thereof, reference is made to related contents of the above in-game processing method, and details are not described again below.

FIG. 12 is a structural schematic diagram of the in-game processing apparatus provided in an embodiment of the present disclosure, and as shown in FIG. 12, this apparatus includes:

a determining module 1201, configured to determine, in response to character attributes of a virtual object satisfying a first attribute threshold, a first order, in which the character attributes of the virtual object are restored to a second attribute threshold, configured by the game application;

a changing module 1202, configured to, in response to an order transfer operation, determine a target virtual character from at least one virtual character, change an order of the target virtual character from the current order to the first order, and change the order of the virtual object from the first order to a preset order, where the at least one virtual character is a character whose character attributes satisfy the first attribute threshold; and a restoring module 1203, configured to control to restore the character attributes of the target virtual character to the second attribute threshold according to the first order.

In some embodiments, the determining module 1201 is further configured to determine, in response to a character energy parameter of the virtual object being smaller than or equal to a preset first energy threshold, a first order, in which the character energy parameter of the virtual object is restored to a preset second energy threshold, configured by the game application.

In some embodiments, the determining module 1201 is further configured to determine, in response to character attributes of the virtual object satisfying a first attribute threshold, waiting duration information configured by the game application for restoring the character attributes of the virtual object to the second attribute threshold; and determine the first order according to the waiting duration information.

In some embodiments, the restoring module 1203 is configured to restore, in response to a selection operation on a restoration position, the character attributes of the target virtual character to the second attribute threshold at the restoration position selected, according to the first order.

In some embodiments, the restoring module 1203 is configured to display, in the graphical user interface, a selection control of at least one teammate virtual object in the same team as the virtual object, and state information corresponding to the teammate virtual object; and restore, in response to a selection operation on the selection control input for the target teammate virtual object in the at least one teammate virtual object, the character attributes of the target virtual character to the second attribute threshold within a preset range around the target teammate virtual object, according to the first order.

In some embodiments, the restoring module 1203 is further configured to display, in response to the selection operation on the selection control input for the target teammate virtual object, a combat state control in the graphical user interface; and restore, if the combat state control of the target teammate virtual object is a deployment control, in response to a selection operation on the deployment control, the character attributes of the target virtual character to the second attribute threshold within the preset range around the target teammate virtual object, according to the first order.

In some embodiments, the apparatus further includes:

a setting module, configured to, if the target teammate virtual object is currently in a combat, prompt by the combat state control that the target teammate virtual object is in a combat state, and set the combat state control to an uncontrollable state.

In some embodiments, the apparatus further includes:

a jumping module, configured to jump to a restoration waiting interface in response to the character attributes of the virtual object satisfying the first attribute threshold; and a displaying module, configured to display in the restoration waiting interface a redeployment waiting duration of the virtual object and state information on at least one teammate virtual object of the virtual object.

In some embodiments, the jumping module is further configured to display waiting-for-restoration prompt information in a restoration prompt interface of the virtual object, where the waiting-for-restoration prompt information includes: the first order and/or the waiting duration information; and jump to the restoration waiting interface after displaying the waiting-for-restoration prompt information for a preset duration.

In some embodiments, the restoration waiting interface includes a duration reducing control; and the apparatus further includes:

a first determining module, configured to determine, in response to a selection operation on the duration reducing control, to consume a virtual resource of the virtual object, and reduce the redeployment waiting duration by time corresponding to the virtual resource.

In some embodiments, the restoration waiting interface and the restoration prompt interface include a restoration transfer control; and the order transfer operation is a selection operation on the restoration transfer control.

The above apparatus is configured to execute the method provided in the foregoing embodiments, and has similar implementation principle and technical effects, which are not described herein again.

These above modules may be one or more integrated circuits configured to implement the above method, for example, one or more application specific integrated circuits (ASIC for short), or one or more digital signal processors (DSP for short), or one or more field programmable gate arrays (FPGA for short), etc. For another example, when a certain module above is implemented in the form of a processing element scheduling program code, the processing element may be a general purpose processor, for example, a central processing unit (CPU for short) or other processors that can invoke the program code. For another example, these modules may be integrated together and implemented in the form of a system-on-a-chip (SOC for short).

FIG. 13 is a structural schematic diagram of a terminal provided in an embodiment of the present disclosure, as shown in FIG. 13, including a processor 1301 and a memory 1302.

The memory 1302 is configured to store a program, and the processor 1301 invokes the program stored in the memory 1302 to execute the above method embodiments.

In the above, the processor 1301 invokes the program stored in the memory 1302, and the method executed may include steps of determining, in response to character attributes of a virtual object satisfying a first attribute threshold, a first order, in which the character attributes of the virtual object are restored to a second attribute threshold, configured by a game application;

in response to an order transfer operation, determining a target virtual character from at least one virtual character, changing an order of the target virtual character from the current order to the first order, and changing the order of the virtual object from the first order to a preset order, where at least one virtual character is a character whose character attributes satisfy the first attribute threshold; and controlling to restore the character attributes of the target virtual character to the second attribute threshold according to the first order.

In some embodiments, the step of determining, in response to character attributes of a virtual object satisfying a first attribute threshold, a first order, in which the character attributes of the virtual object are restored to a second attribute threshold, configured by the game application includes a step of:

determining, in response to a character energy parameter of the virtual object being smaller than or equal to a preset first energy threshold, a first order, in which the character energy parameter of the virtual object is restored to a preset second energy threshold, configured by the game application.

In some embodiments, the step of determining, in response to character attributes of a virtual object satisfying a first attribute threshold, a first order, in which the character attributes of the virtual object are restored to a second attribute threshold, configured by the game application includes steps of:

determining, in response to character attributes of a virtual object satisfying a first attribute threshold, waiting duration information configured by the game application for restoring the character attributes of the virtual object to the second attribute threshold;

determining the first order according to the waiting duration information.

In some embodiments, the step of controlling to restore the character attributes of the target virtual character to the second attribute threshold according to the first order includes a step of:

restoring, in response to a selection operation on a restoration position, the character attributes of the target virtual character to the second attribute threshold at the restoration position selected, according to the first order.

In some embodiments, the step of restoring, in response to a selection operation on a restoration position, the character attributes of the target virtual character to the second attribute threshold at the restoration position selected, according to the first order includes steps of:

displaying, in a graphical user interface, a selection control of at least one teammate virtual object in the same team as the virtual object, and state information corresponding to the teammate virtual object; and restoring, in response to a selection operation on the selection control input for the target teammate virtual object in at least one teammate virtual object, the character attributes of the target virtual character to the second attribute threshold within a preset range around the target teammate virtual object, according to the first order.

In some embodiments, the step of restoring, in response to a selection operation on the selection control input for the target teammate virtual object in at least one teammate virtual object, the character attributes of the target virtual character to the second attribute threshold within a preset range around the target teammate virtual object, according to the first order includes steps of displaying, in response to the selection operation on the selection control input for the target teammate virtual object, a combat state control in the graphical user interface; and restoring, if the combat state control of the target teammate virtual object is a deployment control, in response to a selection operation on the deployment control, the character attributes of the target virtual character to the second attribute threshold within the preset range around the target teammate virtual object, according to the first order.

In some embodiments, the method further includes a step of if the target teammate virtual object is currently in a combat, the combat state control prompting that the target teammate virtual object is in a combat state, and setting the combat state control to an uncontrollable state.

In some embodiments, the method further includes steps of jumping to a restoration waiting interface in response to the character attributes of the virtual object satisfying the first attribute threshold; and displaying in the restoration waiting interface a redeployment waiting duration of the virtual object and state information on at least one teammate virtual object of the virtual object.

In some embodiments, the step of jumping to the restoration waiting interface includes steps of:

displaying waiting-for-restoration prompt information in a restoration prompt interface of the virtual object, where the waiting-for-restoration prompt information includes: the first order and/or the waiting duration information; and jumping to the restoration waiting interface after displaying the waiting-for-restoration prompt information for a preset duration.

In some embodiments, the restoration waiting interface includes a duration reducing control; and the method further includes a step of determining, in response to a selection operation on the duration reducing control, to consume a virtual resource of the virtual object, and reducing the redeployment waiting duration by time corresponding to the virtual resource.

In some embodiments, the restoration waiting interface and the restoration prompt interface include therein a restoration transfer control; and the order transfer operation is a selection operation on the restoration transfer control.

To sum up, in response to the order transfer operation, the first order of the virtual object when restoring the character attributes is assigned to the target virtual character, realizing that the character attributes of the target virtual character can be restored according to the first order, which makes a sequence of restoring the character attributes of the virtual object in the game more flexible, and improves players' game experience.

In some embodiments, the present disclosure further provides a program product, for example, a non-transitory computer readable storage medium, including a program, and when the program is executed by a processor, the above method embodiments are executed.

In the above, when the program is executed by the processor, the method executed may include steps of determining, in response to character attributes of a virtual object satisfying a first attribute threshold, a first order, in which the character attributes of the virtual object are restored to a second attribute threshold, configured by a game application;

in response to an order transfer operation, determining a target virtual character from at least one virtual character, changing an order of the target virtual character from the current order to the first order, and changing the order of the virtual object from the first order to a preset order, where at least one virtual character is a character whose character attributes satisfy the first attribute threshold; and controlling to restore the character attributes of the target virtual character to the second attribute threshold according to the first order.

In some embodiments, the step of determining, in response to character attributes of a virtual object satisfying a first attribute threshold, a first order, in which the character attributes of the virtual object are restored to a second attribute threshold, configured by the game application includes a step of determining, in response to a character energy parameter of the virtual object being smaller than or equal to a preset first energy threshold, a first order, in which the character energy parameter of the virtual object is restored to a preset second energy threshold, configured by the game application.

In some embodiments, the step of determining, in response to character attributes of a virtual object satisfying a first attribute threshold, a first order, in which the character attributes of the virtual object are restored to a second attribute threshold, configured by a game application includes steps of determining, in response to the character attributes of the virtual object satisfying the first attribute threshold, waiting duration information configured by the game application for restoring the character attributes of the virtual object to the second attribute threshold; and determining the first order according to the waiting duration information.

In some embodiments, the step of controlling to restore the character attributes of the target virtual character to the second attribute threshold according to the first order includes a step of:

restoring, in response to a selection operation on a restoration position, the character attributes of the target virtual character to the second attribute threshold at the restoration position selected, according to the first order.

In some embodiments, the step of restoring, in response to a selection operation on a restoration position, the character attributes of the target virtual character to the second attribute threshold at the restoration position selected, according to the first order includes steps of:

displaying, in the graphical user interface, a selection control of at least one teammate virtual object in the same team as the virtual object, and state information corresponding to the teammate virtual object; and restoring, in response to a selection operation on the selection control input for the target teammate virtual object in at least one teammate virtual object, the character attributes of the target virtual character to the second attribute threshold within a preset range around the target teammate virtual object, according to the first order.

In some embodiments, the step of restoring, in response to a selection operation on the selection control input for the target teammate virtual object in at least one teammate virtual object, the character attributes of the target virtual character to the second attribute threshold within a preset range around the target teammate virtual object, according to the first order includes steps of displaying, in response to the selection operation on the selection control input for the target teammate virtual object, a combat state control in the graphical user interface; and restoring, if the combat state control of the target teammate virtual object is a deployment control, in response to a selection operation on the deployment control, the character attributes of the target virtual character to the second attribute threshold within the preset range around the target teammate virtual object, according to the first order.

In some embodiments, the method further includes a step of if the target teammate virtual object is currently in a combat, the combat state control prompting that the target teammate virtual object is in a combat state, and setting the combat state control to an uncontrollable state.

In some embodiments, the method further includes steps of jumping to a restoration waiting interface in response to the character attributes of the virtual object satisfying the first attribute threshold; and displaying in the restoration waiting interface a redeployment waiting duration of the virtual object and state information on at least one teammate virtual object of the virtual object.

In some embodiments, the step of jumping to the restoration waiting interface includes steps of:

displaying waiting-for-restoration prompt information in a restoration prompt interface of the virtual object, where the waiting-for-restoration prompt information includes: the first order and/or the waiting duration information; and jumping to the restoration waiting interface after displaying the waiting-for-restoration prompt information for a preset duration.

In some embodiments, the restoration waiting interface includes a duration reducing control; and the method further includes a step of determining, in response to a selection operation on the duration reducing control, to consume a virtual resource of the virtual object, and reducing the redeployment waiting duration by time corresponding to the virtual resource.

In some embodiments, the restoration waiting interface and the restoration prompt interface include therein a restoration transfer control; and the order transfer operation is a selection operation on the restoration transfer control.

To sum up, in response to the order transfer operation, the first order of the virtual object when restoring the character attributes is assigned to the target virtual character, realizing that the character attributes of the target virtual character can be restored according to the first order, which makes a sequence of restoring the character attributes of the virtual object in the game more flexible, and improves players' game experience.

In the several embodiments provided in the present disclosure, it should be understood that the disclosed apparatus and method may be implemented in other manners. For example, the apparatus embodiments described in the above are merely exemplary, for example, the units are merely divided according to logical functions, but they may be divided in other manners in practical implementation, for example, multiple units or components may be combined or may be integrated into another system, or some features may be omitted, or not executed. In addition, mutual couplings or direct couplings or communicative connections as shown or discussed may be indirect couplings or communicative connections via some communication interfaces, means or units, and may be in an electrical form, a mechanical form or other forms.

The units described as separate parts may be or also may not be physically separated, the parts displayed as units may be or also may not be physical units, i.e., they may be located at one place, or also may be distributed on a plurality of network units. Some or all of the units may be selected according to actual needs to achieve the objectives of the solutions in the embodiments.

Besides, various functional units in various embodiments of the present disclosure may be integrated into one processing unit, and each unit also may exist in a physically independent way, and two or more than two units also may be integrated into one unit. The above integrated unit may be implemented in the form of hardware, or in the form of hardware plus a software functional unit.

The above integrated unit implemented in a form of software functional unit may be stored in one computer-readable storage medium. The above software functional unit is stored in one storage medium, including several instructions used to make one computer device (which can be a personal computer, a sever or a network device etc.) or a processor execute some of the steps of the methods of various embodiments of the present disclosure. The aforementioned storage medium includes various media that can store program codes such as U disk, mobile hard disk, read-only memory (ROM for short), random access memory (RAM for short), magnetic disk or optical disk.

The above-mentioned are merely for preferred embodiments of the present disclosure, and not used to limit the present disclosure, and for those skilled in the art, various modifications and changes may be made to the present disclosure. Any modifications, equivalent substitutions, improvements and the like made within the spirit and principle of the present disclosure should be covered within the scope of protection of the present disclosure.

What is claimed is:

1. An in-game processing method, comprising:
a terminal determining, in response to character attributes of a virtual object satisfying a first attribute threshold, a first order, in which the character attributes of the virtual object are restored to a second attribute threshold, configured by a game application, wherein a graphical user interface of the game application is provided by the terminal;
in response to an order transfer operation, determining a target virtual character from at least one virtual character, changing an order of the target virtual character from a current order to the first order, and changing an order of the virtual object from the first order to a preset order, wherein the at least one virtual character is a character whose character attributes satisfy the first attribute threshold; and controlling to restore character attributes of the target virtual character to the second attribute threshold according to the first order.

2. The method according to claim 1, wherein the determining in response to character attributes of the virtual object satisfying the first attribute threshold the first order in which the character attributes of the virtual object are restored to the second attribute threshold configured by the game application comprises:
determining, in response to a character energy parameter of the virtual object being smaller than or equal to a preset first energy threshold, a first order, in which the character energy parameter of the virtual object is restored to a preset second energy threshold, configured by the game application.

3. The method according to claim 2, wherein the character energy parameter of the virtual object being smaller than or equal to the preset first energy threshold comprises:
the character energy parameter of the virtual object being relatively low; or
the character energy parameter of the virtual object being 0 and the virtual object having been eliminated.

4. The method according to claim 1, wherein the determining in response to character attributes of the virtual object satisfying the first attribute threshold, the first order in which the character attributes of the virtual object are restored to the second attribute threshold configured by the game application comprises:
determining, in response to the character attributes of the virtual object satisfying the first attribute threshold, waiting duration information configured by the game application for restoring the character attributes of the virtual object to the second attribute threshold; and
determining the first order according to the waiting duration information, comprising:
the terminal determining a current sequence of the virtual object according to the waiting duration information and a preset unit waiting duration which is duration required for restoring character attributes of one virtual object, wherein the current sequence is the first order.

5. The method according to claim 1, wherein the controlling to restore character attributes of the target virtual character to the second attribute threshold according to the first order comprises:
restoring, in response to a selection operation on a restoration position, the character attributes of the target virtual character to the second attribute threshold at a restoration position selected, according to the first order.

6. The method according to claim 5, wherein the restoring in response to the selection operation on the restoration position the character attributes of the target virtual character to the second attribute threshold at the restoration position selected according to the first order comprises:
displaying, in the graphical user interface, a selection control of at least one teammate virtual object in the same team as the virtual object, and state information corresponding to the teammate virtual object; and
restoring, in response to a selection operation on the selection control input for a target teammate virtual object in the at least one teammate virtual object, the character attributes of the target virtual character to the second attribute threshold within a preset range around the target teammate virtual object, according to the first order.

7. The method according to claim 6, wherein the restoring in response to the selection operation on the selection control input for the target teammate virtual object in the at least one teammate virtual object the character attributes of the target virtual character to the second attribute threshold within the preset range around the target teammate virtual object according to the first order comprises:

displaying, in response to the selection operation on the selection control input for the target teammate virtual object, a combat state control in the graphical user interface; and restoring, in response to the combat state control of the target teammate virtual object being a deployment control, in response to a selection operation on the deployment control, the character attributes of the target virtual character to the second attribute threshold within the preset range around the target teammate virtual object, according to the first order.

8. The method according to claim 7, further comprising:

in response to the target teammate virtual object being currently in a combat, the combat state control prompting that the target teammate virtual object is in a combat state, and setting the combat state control to an uncontrollable state.

9. The method according to claim 5, wherein the selection operation on the restoration position is:

a selection operation input for a target position in a game scene; or a selection operation input for a target virtual article in the game scene.

10. The method according to claim 6, wherein the state information corresponding to the teammate virtual object comprises a teammate virtual object waiting for restoration, a teammate virtual object not in a combat state, and a teammate virtual object being in a combat state.

11. The method according to claim 7, further comprising:

displaying automatic deployment countdown prompt information in the graphical user interface, wherein the automatic deployment countdown prompt information is configured to prompt that automatic deployment is performed after countdown is completed.

12. The method according to claim 7, further comprising:

in response to the target teammate virtual object being currently in a to-be-restored state, setting the combat state control to an uncontrollable state.

13. The method according to claim 1, further comprising:

jumping to a restoration waiting interface in response to the character attributes of the virtual object satisfying the first attribute threshold; and displaying in the restoration waiting interface a redeployment waiting duration of the virtual object and state information on at least one teammate virtual object of the virtual object.

14. The method according to claim 13, wherein the jumping to the restoration waiting interface comprises:

displaying waiting-for-restoration prompt information in a restoration prompt interface of the virtual object, wherein the waiting-for-restoration prompt information comprises: the first order and/or waiting duration information; and jumping to the restoration waiting interface after displaying the waiting-for-restoration prompt information for a preset duration.

15. The method according to claim 13, further comprising:

determining, in response to a selection operation on a duration reducing control, to consume a virtual resource of the virtual object, and reducing the redeployment waiting duration by time corresponding to the virtual resource, wherein the restoration waiting interface comprises the duration reducing control.

16. The method according to claim 14, wherein the restoration waiting interface and the restoration prompt interface comprise therein a restoration transfer control; and the order transfer operation is a selection operation on the restoration transfer control.

17. The method according to claim 1, further comprising:

in response to the character attributes of the virtual object satisfying the first attribute threshold, displaying a waiting-for-redeployment interface, wherein the waiting-for-redeployment interface displays waiting-for-redeployment prompt information; and jumping to a restoration waiting interface after the waiting-for-redeployment interface is displayed for a preset duration.

18. A terminal, comprising a memory and a processor, wherein the memory stores a computer program executable by the processor, and when the processor executes the computer program, an in-game processing method is realized, wherein the in-game processing method comprises:

the terminal determining, in response to character attributes of a virtual object satisfying a first attribute threshold, a first order, in which the character attributes of the virtual object are restored to a second attribute threshold, configured by a game application, wherein a graphical user interface of the game application is provided by the terminal;

in response to an order transfer operation, determining a target virtual character from at least one virtual character, changing an order of the target virtual character from a current order to the first order, and changing an order of the virtual object from the first order to a preset order, wherein the at least one virtual character is a character whose character attributes satisfy the first attribute threshold; and controlling to restore character attributes of the target virtual character to the second attribute threshold according to the first order.

19. A non-transitory storage medium, wherein the storage medium stores a computer program, and when the computer program is read and executed, an in-game processing method is realized, wherein the in-game processing method comprises:

determining, in response to character attributes of a virtual object satisfying a first attribute threshold, a first order, in which the character attributes of the virtual object are restored to a second attribute threshold, configured by a game application, wherein a graphical user interface of the game application is provided by a terminal;

in response to an order transfer operation, determining a target virtual character from at least one virtual character, changing an order of the target virtual character from a current order to the first order, and changing an order of the virtual object from the first order to a preset order, wherein the at least one virtual character is a character whose character attributes satisfy the first attribute threshold; and controlling to restore character attributes of the target virtual character to the second attribute threshold according to the first order.

* * * * *